(12) United States Patent
Hitzlsperger et al.

(10) Patent No.: US 11,685,151 B2
(45) Date of Patent: Jun. 27, 2023

(54) METHOD AND DEVICE FOR ASCERTAINING PRINT DATA FOR AN INKJET PRINTING DEVICE

(71) Applicant: Canon Production Printing Holding B.V., Venlo (NL)

(72) Inventors: Florian Hitzlsperger, Poing (DE); Jochen Reinders, Isen (DE); Ulrich Stöckle, Munich (DE); Eva Pichlmeier, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 17 days.

(21) Appl. No.: 17/389,822

(22) Filed: Jul. 30, 2021

(65) Prior Publication Data

US 2022/0040972 A1    Feb. 10, 2022

(30) Foreign Application Priority Data

Aug. 4, 2020   (DE) .......................... 102020120482.5

(51) Int. Cl.
| | | |
|---|---|---|
| *B41J 29/393* | (2006.01) | |
| *B41J 2/045* | (2006.01) | |
| *G06K 15/10* | (2006.01) | |
| *G06K 15/02* | (2006.01) | |
| *G06K 15/00* | (2006.01) | |

(52) U.S. Cl.
CPC ......... *B41J 2/0451* (2013.01); *B41J 2/04573* (2013.01); *B41J 2/04581* (2013.01); *G06K 15/102* (2013.01); *G06K 15/1823* (2013.01); *G06K 15/1825* (2013.01); *G06K 15/1836* (2013.01); *G06K 15/1842* (2013.01); *G06K 15/408* (2013.01)

(58) Field of Classification Search
CPC ........ B41J 29/393; B41J 2/0451; B41J 2/165; B41J 2/2142; G06K 15/1842; G06K 15/408

See application file for complete search history.

(56) References Cited

U.S. PATENT DOCUMENTS

2005/0146543 A1    7/2005  Smith et al.

FOREIGN PATENT DOCUMENTS

JP           2006088391 A  *  4/2006  ................ B41J 3/04

* cited by examiner

*Primary Examiner* — Julian D Huffman
(74) *Attorney, Agent, or Firm* — The Webb Law Firm

(57) ABSTRACT

In a method and device for ascertaining print data for a print image to be printed, the print data is adapted and/or determined such that the time curve of the ink flow quantity, exhibits no quantity changes or flow rates due to which ink ejection errors might be produced, in particular nozzle failures. The device includes: a communication interface configured to receive the print data; and processing circuitry that ascertains, based on the print data, a time curve of an ink flow quantity of ink that, during the printing of the print image, flows in the print bar and/or is ejected from the one or more nozzles of the print bar; and determine, based on the time curve of the ink flow quantity, whether an ink ejection error will be produced.

12 Claims, 4 Drawing Sheets

METHOD AND DEVICE FOR ASCERTAINING PRINT DATA FOR AN INKJET PRINTING DEVICE

CROSS REFERENCE TO RELATED APPLICATIONS

This patent application claims priority to German Patent Application No. 10 2020 120 482.5, filed Aug. 4, 2020, which is incorporated herein by reference in its entirety.

BACKGROUND

Field

The disclosure relates to a method and a corresponding device that enable print data for a print image to be ascertained that may be printed from a print bar of an inkjet printing device without ink ejection errors.

Related Art

An inkjet printing device for printing to a recording medium may comprise at least one print bar with one or more print heads respectively having one or more nozzles. The nozzles are respectively configured to eject ink droplets in order to print dots of a print image on the recording medium.

To supply the individual print heads with ink, ink may be supplied from an ink container to the individual print heads of a print bar via supply lines. Due to the design of the ink supply of a print bar, individual nozzle failures, i.e. ink ejection failures, may possibly occur in the printing of a print image, whereby the print quality of the print image is negatively affected.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
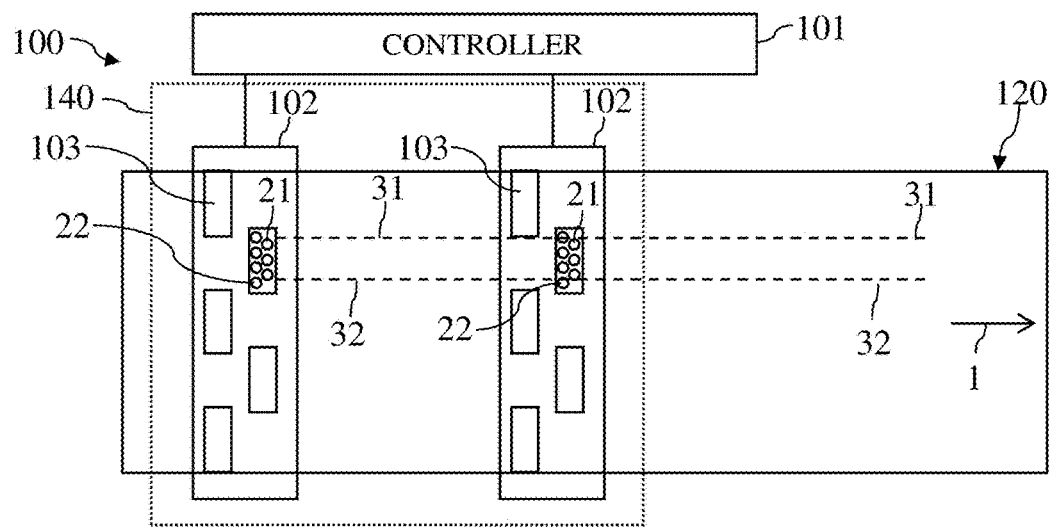

FIG. 1 a block diagram of an inkjet printing device according to an exemplary embodiment.

Figure 2:
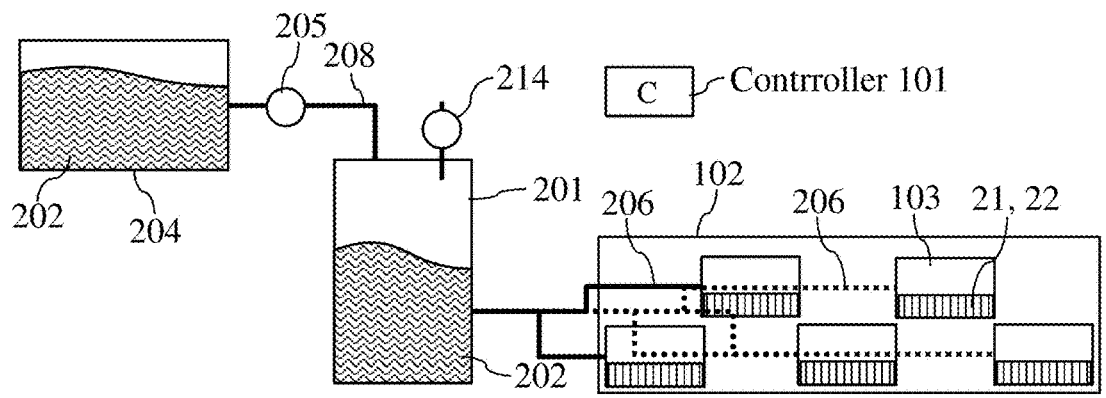

FIG. 2 an ink supply of the one or more print heads of a print bar of an inkjet printing device according to an exemplary embodiment.

Figure 3A:
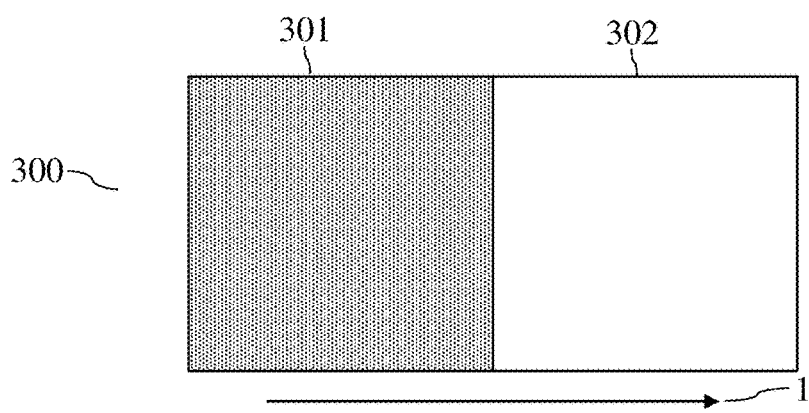
Figure 3B:
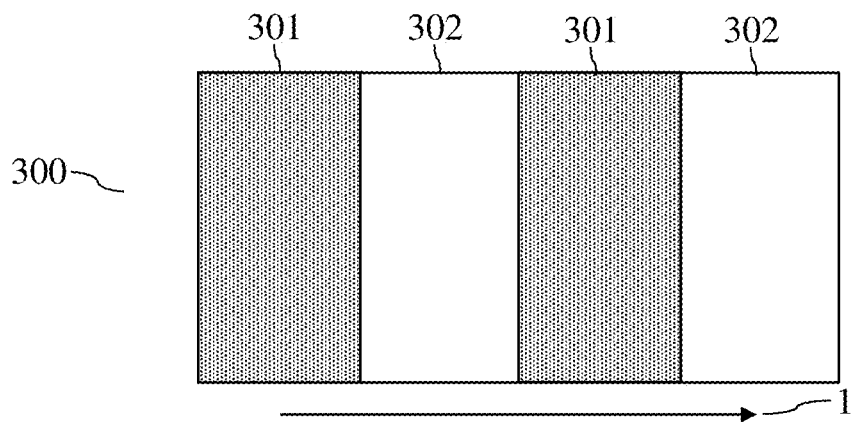
Figure 3C:
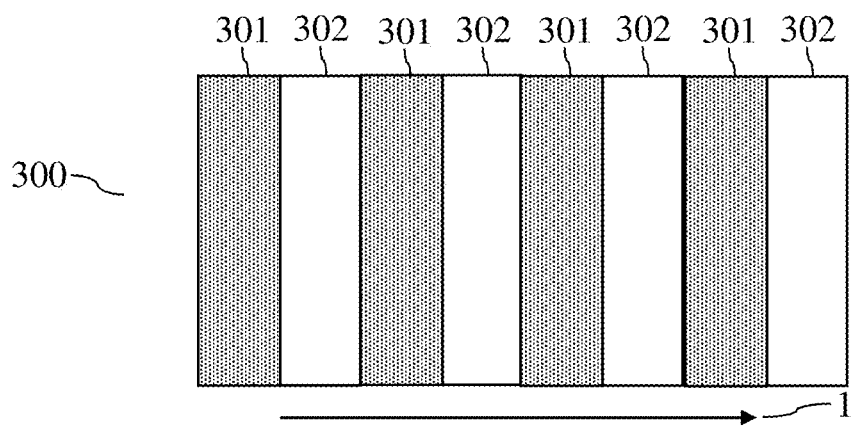

FIG. 3a-3c examples of print images having different frequencies of the change in ink flow quantity (having different frequencies of the ink flow rate) according to an exemplary embodiment.

Figure 3D:
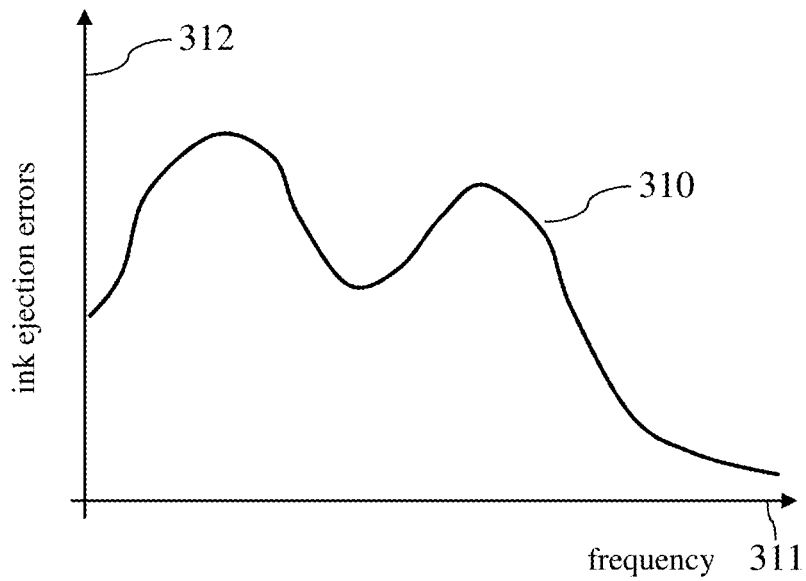

FIG. 3d a plot of number of nozzle errors as a function of the frequency of change of the ink flow quantity according to an exemplary embodiment.

Figure 4A:
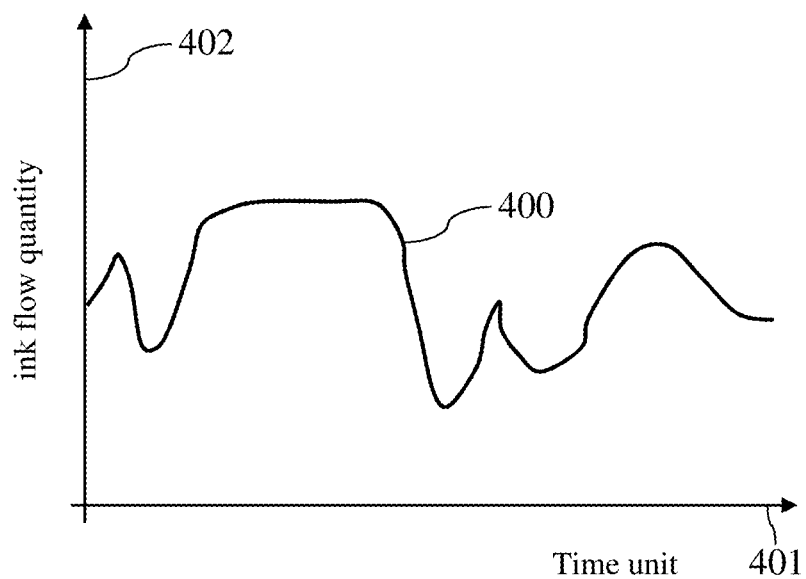

FIG. 4a a plot of a time curve of the ink flow quantity according to an exemplary embodiment.

Figure 4B:
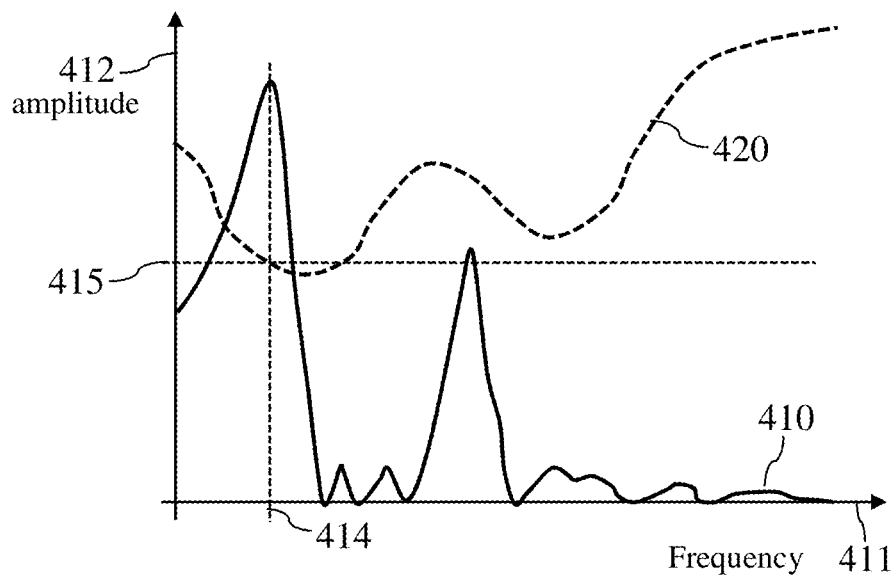

FIG. 4b a plot of an amplitude spectrum of the time curve of the ink flow quantity according to an exemplary embodiment.

Figure 5:
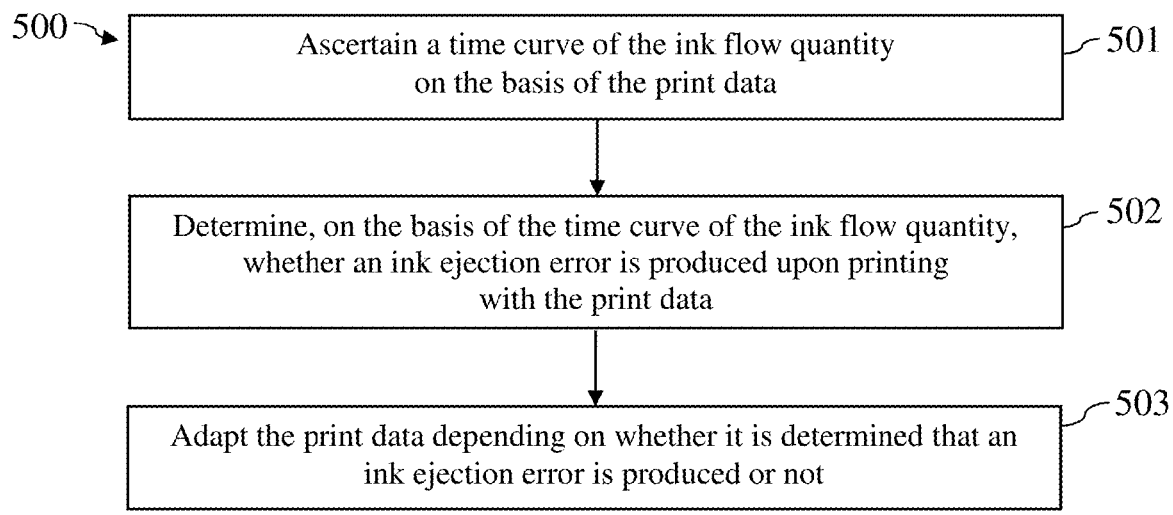

FIG. 5 a flowchart of a method for ascertaining print data for a print image to be printed according to an exemplary embodiment.

The exemplary embodiments of the present disclosure will be described with reference to the accompanying drawings.

Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to avoid ink ejection failures, in particular ink ejection failures caused by the ink supply, in the printing of a print image, in order to increase the print quality of the print image.

According to one aspect of the disclosure, a device is described for ascertaining print data for a print image to be printed by a print bar of an inkjet printing device, wherein the print bar comprises one or more nozzles. For a plurality of dots of the print image, the print data indicate the respective ink quantity that is to be ejected by a respective nozzle of the print bar.

The device is configured to ascertain and/or to predict, on the basis of the print data, a time curve of the ink flow quantity of ink that flows during the printing of the print image in the print bars and/or that is ejected from the one or more nozzles of the print bar during the printing of the print image. The device is also configured to determine and/or to predict, on the basis of the time curve of the ink flow quantity, whether an ink ejection error—in particular a nozzle failure—of at least one nozzle will be produced during the printing of the print image due to changes in the ink flow quantity. Furthermore, the device is configured to adapt the print data for the print image to be printed depending on whether it is determined or predicted that an ink ejection error will be produced or not.

According to a further aspect of the disclosure, a method is described for ascertaining print data for a print image to be printed by a print bar of an inkjet printing device. The method includes ascertaining, on the basis of the print data, of a time curve of the ink flow quantity of ink that flows in the print bar during the printing of the print image and/or is ejected from one or more nozzles of the print bar. Furthermore, the method includes the determination or prediction, on the basis of the time curve of the ink flow quantity, of whether an ink ejection error of at least one nozzle will be produced during the printing of the print image. The method also includes the adaptation of the print data for the print image to be printed depending on whether it is determined or predicted that an ink ejection error will be produced or not.

The printing device 100 depicted in FIG. 1 is designed for printing to a recording medium 120 in the form of a sheet or page or plate or belt. The recording medium 120 may be produced from paper, paperboard, cardboard, metal, plastic, textiles, a combination thereof, and/or other materials that are suitable and can be printed to. The recording medium 120 is directed along the transport direction 1, represented by an arrow, through the print group 140 of the printing device 100.

In the depicted example, the print group 140 of the printing device 100 comprises two print bars 102, wherein each print bar 102 may be used for printing with ink of a defined color, for example black, cyan, magenta, and/or yellow, and if applicable MICR ink. Different print bars 102 may be used for printing with respective different inks. Furthermore, the printing device 100 typically comprises at least one fixing or drying unit that is not shown in FIG. 1 and that is configured to fix a print image printed onto the recording medium 120.

A print bar 102 may comprise one or more print heads 103 that, if applicable, are arranged side by side in a plurality of rows in order to print the dots of different columns 31, 32 of a print image onto the recording medium 120. In the example depicted in FIG. 1, a print bar 102 comprises five print heads 103, wherein each print head 103 prints the dots of a group of columns 31, 32 of a print image onto the recording medium 120. The number of print heads 103 of a print bar 102 may be 5, 10, or more, for example.

In the embodiment depicted in FIG. 1, each print head 103 of the print group 140 comprises a plurality of nozzles 21, 22, wherein each nozzle 21, 22 is configured to fire or eject ink droplets onto the recording medium 120. A print head 103 of the print group 140 may, for example, comprise multiple thousands of effectively utilized nozzles 21, 22 that are arranged along a plurality of rows transverse to the transport direction 1 of the recording medium 120. By means of the nozzles 21, 22 of a print head 103 of the print group 140, dots of a line of a print image may be printed onto the recording medium 120 transverse to the transport direction 1, meaning along the width of the recording medium 120.

The printing device (printer) 100 also comprises a controller 101 (e.g. an activation hardware and/or a processor) that is configured to activate the actuators of the individual nozzles 21, 22 of the individual print heads 103 of the print group 140 in order to apply the print image onto the recording medium 120 depending on print data. In an exemplary embodiment, the controller 101 includes processor circuitry that is configured to perform one or more functions and/or operations of the controller 101, including activating the actuators of the individual nozzles, processing the print data, and/or controlling the overall operation of the printing device 100.

The print group 140 of the printing device 100 thus comprises at least one print bar 102 having K nozzles 21, 22 that may be arranged in one or more print heads 103 and that may be activated with a defined line timing in order to print a respective line, traveling transverse to the transport direction 1 of the recording medium 120, with K pixels or K columns 31, 32 of a print image onto the recording medium 120, for example with K>1000. In the depicted example, the nozzles 21, 22 are immobile or permanently installed in the printing device 100, and the recording medium 120 is directed past the stationary nozzles 21, 22 with a defined transport velocity.

FIG. 2 shows the ink supply of an example of a print head 103. With the ink supply depicted in FIG. 2, the one or more print heads 103 of a print bar 102 may be supplied with ink 202 of a defined ink type, for example of a defined color. The ink supply depicted in FIG. 2 may respectively be provided for each print bar 102 and/or for each used ink type of a printing device 100.

Ink 202 may be supplied via an ink supply channel 206 to the individual nozzles 21, 22 of a print head 103. The ink supply channel 206 may thereby draw the ink 202 from a negative pressure or backpressure vessel 201. The negative pressure vessel 201 may in turn be supplied with ink 202 from a supply container 204 via an ink supply channel 208. The ink 202 may thereby be conveyed by means of a supply transport module 205, in particular by means of a pump, from the supply container 204 into the negative pressure vessel 201. The negative pressure vessel 201 may be used to set a defined physical negative pressure within the individual nozzles 21, 22 of the print heads 103. Via this physical negative pressure, it may be ensured that no ink 202 escapes from the nozzles 21, 22 during the printing operation of the printing device 100. Furthermore, via the physical negative pressure it may be produced that an ink meniscus forms at the output of a nozzle 21, 22, which ink meniscus may be set into motion by an actuator of the nozzle 21, 22—for example by a piezoelectric actuator—in order to eject an ink droplet from the nozzle 21, 22.

The physical negative pressure may be mechanically set via the height difference between the nozzle plate of the print heads 103 and the fill level of the negative pressure vessel 201. To adjust the negative pressure in the nozzles 21, 22, the fill level of the negative pressure vessel 201 may thus be set, in particular regulated, to a defined fill level value. Alternatively or additionally, the negative pressure in the negative pressure vessel 201 may be set via a pressure module 214, for example by a pump.

In printing operation, nozzle failures may occur given relatively high load changes, i.e. given relatively stark changes of the ink application onto a recording medium 120, for example given an ink coverage that repeatedly changes between 0% and 100%. In particular, this may take place when all print heads 103 of a print bar 102 simultaneously begin with a relatively high load, i.e. with a relatively high ink application.

Such disruptions of the printing operation, in particular such nozzles failures or ink ejection errors, may be avoided via a generally established reduction of the maximum achievable color space, i.e. via a reduction of the maximum possible ink application or of the maximum possible ink quantity, on the recording medium 120. Within the scope of the development of a printing device 100, the maximum achievable color space via which ink flow-dependent disruptions of the printing operation may be avoided may be ascertained and established experimentally.

However, the blanket reduction of the maximum achievable color space of print images leads to a limitation of the print quality. In this document, measures are described with which ink flow-dependent disruptions of the printing operation may be reliably avoided, possibly even without blanket reduction of the maximum achievable color space.

As has already been presented above, a printing device 100, in particular the ink supply of the printing device 100, may be susceptible to print load changes, in particular to fluctuations of the ink flow quantity, upon printing a print image. The susceptibility of a printing device 100 to changes of the ink flow quantity during the printing operation may be ascertained experimentally for a printing device 100. This is depicted by way of example in FIGS. 3a through 3d. FIG. 3a shows a print image 300 having an inked image region 301 and having a non-inked image region 302. The inked image region 301 comprises a plurality of inked lines, for example, whereas the non-inked image region 302 has a plurality of non-inked lines. FIG. 3*a* shows only one period of the print image 300, meaning that the print image 300 may alternatively have, across a plurality of periods, an inked image region 301 and a non-inked image region 302, respectively.

At the transition between the two image regions 301, 302, a discontinuous change of the ink flow quantity occurs, in particular a discontinuous rise of the ink flow quantity at a transition from an non-inked image region 302 to an inked image region 301, and a discontinuous decrease of the ink flow quantity at a transition from an inked image region 301 to an non-inked image region 302. Given the periodic juxtaposition of the print image section depicted in FIG. 3*a*, the ink flow quantity thus changes with a defined change frequency. The change frequency thereby depends on the number of lines per image region 301, 302, and/or on the transport velocity of the recording medium 120. In the example depicted in FIG. 3*a*, the change frequency of the ink flow quantity is 1 Hz.

As depicted in FIGS. 3*b* and 3*c*, additional print images 300 with different change frequencies of the ink flow quantity may be considered, for example 2 Hz in FIG. 3*b* and 4 Hz in FIG. 3*c*. A plurality of print images 300 having a corresponding plurality of change frequencies of the ink flow quantity may thus be considered and printed.

For each change frequency, the number of ink ejection errors, in particular nozzle failures, may be ascertained that results given printing of the respective print image 300. A respective number of ink ejection errors that result given changes of the ink flow quantity, i.e. given ink flow rates, with the respective change frequency may thus be ascertained via use or via printing of the plurality of different print images 300 for the corresponding plurality of change frequencies. A characteristic sensitivity line 310 for the printing device 100, in particular for a print bar 102 or for a print head 102, may be ascertained from this, as is depicted by way of example in FIG. 3*d*. The characteristic sensitivity line 310 thereby indicates the number 312 of ink ejection errors as a function of the change frequency 311 of the ink flow quantity. The characteristic sensitivity line 310 thus indicates for which one or more change frequencies 311 of the ink flow quantity the printing device 100, in particular the print bar 102, exhibits a particularly high or a particularly low susceptibility to ink ejection errors.

The controller 101 of the printing device 100 may be configured to analyze the print data for a print image 300 to be printed. The print data may thereby have been ascertained within the scope of a rastering process (RIP) for an original image to be printed. The original image may be, for example, a computer image or a PDF file that indicates a respective color value in a defined color space, for example, in an RGB color space, for a matrix of dots. In the rastering process, on the basis of the original image a data set may be ascertained for each nozzle 21, 22 and for each line, wherein the data set indicates whether an ink ejection should take place or not; and
the ink quantity to be ejected within the scope of the ink ejection.

For a plurality of lines, the print data thus comprise respective data sets for the individual nozzles 21, 22 of the print bar 102.

As is depicted by way of example in FIG. 4*a*, the controller 101 may be configured to ascertain a time curve 400 of the ink flow quantity 402 on the basis of the print data. In particular, the ink flow quantity 402 that must be provided from the ink supply into a print bar 102 or into a print head 103 of the printing device 100 in order to print the print image 300 may be ascertained per time unit or per line timing signal 401 during the printing of the print image 300. Furthermore, the controller 101 may be configured to check or predict, on the basis of the ascertained time curve 400 of the ink flow quantity 402 and possibly on the basis of the characteristic sensitivity data or characteristic line 310 of the print bar 102, whether one or more ink flow-dependent ink ejection errors are produced during the printing of the print image 300.

For this purpose, the controller 101 may be configured to implement a spectral analysis of the time curve 400 of the ink flow quantity 402. In particular, as is depicted by way of example in FIG. 4*b*, an amplitude spectrum 410 of the time curve 400 of the ink flow quantity 402 may be ascertained. For example, the amplitude spectrum 410 may be ascertained by means of a fast Fourier transformation. Within the scope of the frequency analysis, the time curve 400 of the ink flow quantity 402 may be deconstructed into a plurality of different frequency components for a corresponding plurality of change frequencies 411 of the ink flow quantity 402. For each frequency component, the amplitude spectrum 410 may respectively indicate an energy value or an amplitude 412 of the respective frequency component within the time curve 400 of the ink flow quantity 402.

On the basis of the amplitude spectrum 410, one or more frequency components may be identified for one or more change frequencies 411 via which an ink ejection error might be or will be produced. In particular, the amplitude 412 of the frequency component for a defined change frequency 414 may be compared with an amplitude threshold 415, wherein the amplitude threshold 415 indicates as of which amplitude 412 it is to be anticipated that one or more ink ejection errors are produced. One or more frequency components of the time curve 400 of the ink flow quantity 402 may thus be ascertained that exhibit such a high amplitude 412 that it is to anticipate that one or more ink ejection errors are produced upon printing the print image 300.

The amplitude threshold 415 that is used to identify a critical frequency component may depend on the change frequency 411. In other words, the amplitude thresholds 415 may respectively be different for different change frequencies 411. The amplitude thresholds 415 may thereby be ascertained on the basis of the characteristic sensitivity data 310, in particular such that the amplitude threshold 415 decreases with increasing sensitivity or increases with decreasing sensitivity. FIG. 4*b* shows an example of a curve 410 of the amplitude thresholds 415 for different change frequencies 411.

If it is detected that the time curve 400 of the ink flow quantity 402 exhibits one or more frequency components via which an ink ejection error might be or will be produced upon printing the print image 300, a modification of the print data may take place. In particular, the rastering of the original image may be adapted in order to ascertain adapted print data via which a time curve 400 of the ink ejection quantity 402 is produced that exhibits no frequency component via which an ink ejection error might be produced, in particular that has no frequency component having an amplitude 412 that exceeds the amplitude threshold 415 for the respective change frequency 411.

The controller 101 may thus be configured to examine the data to be printed, meaning the print data, specifically for defined change frequencies 411. In particular, one or more change frequencies 411 may be considered given which the print bar 102 exhibits a particularly high sensitivity with respect to fluctuations of the ink flow quantity 402. For these one or more change frequencies 411, the amplitude threshold 415 is typically relatively low. These one or more critical change frequencies 411 may result due to the structure of the ink supply and/or of the print bar 102, in particular via the arrangement—for example offset from one another and/or with a defined spacing [pitch]—of the one or more print heads 103, and/or via the arrangement of the ink supply channels 206, and/or via the design of the ink supply system, for example with respect to resistances and/or damping.

The analysis of the print load change may take place via a Fourier transformation of the print data, in particular via a Fourier transformation of the time curve 400 of the ink flow quantity 402, so that an amplitude spectrum 410 is provided that indicates, per frequency 411 of the change of the flow rate, the respective value or the amplitude 412 of the ink flow rate with this change frequency 411. If, at a defined frequency 414, for example 2 Hz, the amplitude 412 of the flow rate exceeds the experimentally ascertained amplitude threshold 415, by means of a re-rastering of the print data, the ink quantity may thus be reduced and/or adapted so that a stable operation of the printing device 100 is ensured. On the other hand, if no critical change frequency 411 is identified, the ink quantity may be increased and/or adapted via a re-rastering of the print data so that the color space used for the print image 300 is expanded.

In an exemplary embodiment, in response to determining that the print load change at a defined frequency 414 exceeds the experimentally ascertained amplitude threshold 415, the print data for a rotated image is re-rastered. For example, a rotation of 90 degrees in the one or the other direction will change the time curve of the ink flow quantity. If the print process involves cut sheet recording media, a different input tray with rotated input sheets may be selected. On the other hand, if the print process involves a web fed recording medium, a rotated print may be handled at the output side.

FIG. 5 shows a workflow diagram of an example of a method 500, possibly a computer-implement method 500, for ascertaining print data for a print image 300 to be printed by a print bar 102 of an inkjet printing device 100. The print bar 102 comprises at least one print head 103 having respectively one or more nozzles 21, 22. The print image 300 and the print data may have been derived from an original image via rastering. For a plurality of dots of the print image 300, the print data may respectively indicate the ink quantity that is to be ejected by a respective nozzle 21, 22 of the print bar 102.

The method 500 includes ascertaining 501, on the basis of the print data, the time curve 400 of the ink flow quantity or of the ink quantity 402 of ink 202 that flows in the print bars 102 during the printing of the print image 300, and/or that is ejected during the printing of the print image 300 from the one or more nozzles 21, 22 of the print bar 102. The time curve 400 may respectively indicate the ink flow quantity or the cumulative ink quantity for a plurality of points in time, or for a plurality of line timing cycles 401, or for a plurality of lines of the print image 300. In other words, the time curve 400 may indicate a respective value of the cumulative ink quantity for a plurality of line timing cycles 401. It may thus be ascertained how the ink flow is varied with time during the printing of the print image 300. The time curve 400 of the ink flow quantity 402 may thereby be ascertained without the print image 300 actually being printed by the print bar 102.

The method 500 also includes determining or predicting 502, on the basis of the time curve 400 of the ink flow quantity 402, whether an ink ejection error will be produced by at least one nozzle 21, 22, due to changes to the ink flow quantity 402, during the printing of the print image 300. For this purpose, in particular a frequency analysis of the time curve 400 of the ink flow quantity 402 may be implemented as described in this document. The determination 502 may thereby take place without the print image 300 actually being printed by the print bar 102.

Furthermore, the method 500 includes the adaptation 503 of the print data for the print image 300 to be printed, depending on whether it is determined that an ink ejection error will be produced or not. The print data may thereby be ascertained via an expansion or a reduction of the color space of the print image 300, in particular within the scope of a re-rastering of the original image. In an exemplary embodiment, the re-rastering includes the rotating of the image over 90 degrees. The method 500 may possibly be iteratively repeated in order to achieve an optimized compromise between an optimally large color space and avoiding ink ejection errors (e.g. avoiding nozzle failures) that are produced by the variation of the ink flow quantity.

A method 500 is thus described with which print data for a print image 300 to be printed may be adapted and/or ascertained such that the time curve 400 of the ink flow quantity 402 that is produced by the print data exhibits no quantity changes or flow rates via which ink ejection errors, in particular nozzle failures, might be produced. Furthermore, the print data may be ascertained or adapted such that the print image 300 exhibits an optimally large color space.

Moreover, in this document a controller 101 is described for ascertaining print data for a print image 300 to be printed by a print bar 102 of an inkjet printing device 100. The print bar 102 comprises at least one print head 103 having respectively one or more nozzles 21, 22. The print data show, for a plurality of dots of the print image 300, the respective ink quantity or the droplet size that is to be ejected by a respective nozzle 21, 22 of the print bar 102.

The controller 101 may be configured to ascertain, on the basis of the print data, the time curve 400 of the ink flow quantity 402 of ink 202 that flows in the print bars 102 during the printing of the print image 300, and/or that is ejected from the one or more nozzles 21, 22 of the print bar 102 during the printing of the print image 300.

The time curve 400 of the ink flow quantity 402 may indicate a respective quantity value for a sequence of line timing cycles 401. A line timing cycle 401 may thereby correspond to the time period for printing a line of the print image 300. The print head 103 typically comprises a plurality of nozzles 21, 22 that are designed to print a corresponding plurality of dots of a corresponding plurality of columns 31, 32 of the print image 300 at a defined line timing cycle. The print data may indicate, for each of the plurality of nozzles 21, 22, the ink quantity that is to be ejected at the defined line timing cycle.

The controller 101 may be configured to total up the ink quantity, indicated by the print data, of the plurality of nozzles 21, 22 for the defined line timing cycle 401 in order to ascertain a quantity value of the time curve 400 of the ink flow quantity or of the ink quantity 402 for the defined line timing cycle 401. The quantity values for different line timing cycles 401 may be ascertained accordingly in order to ascertain the time curve 400 of the ink flow quantity 402. The time curve 400 of the ink flow quantity 402 may thus indicate how the ink flow quantity, or for short the ink quantity, 402 varies upon printing different lines of the print image 300. The time curve 400 of the ink flow quantity 402 may possibly be ascertained solely on the basis of the print data. In particular, the time curve 400 of the ink flow quantity 402 may be ascertained before the print image 300 is printed on a recording medium 120.

The controller 101 may also be configured to determine and/or to predict, on the basis of the time curve 400 of the ink flow quantity 402, whether an ink ejection error, in particular a nozzle failure, of at least one nozzle 21, 22 will be produced due to changes of the ink flow quantity 402 during the printing of the print image 300. In particular, it may be ascertained whether the time curve 400 of the ink flow quantity 402 exhibits one or more ink flow rates, for example as one or more frequency components of an amplitude spectrum 410 of the time curve 400 of the ink flow quantity 402, due to which an ink ejection error will be produced.

The controller 101 may be configured to ascertain, on the basis of the time curve 400 of the ink flow quantity 402, an amplitude spectrum 410 that, for a plurality of change frequencies 411 of the ink flow quantity 402, indicates a respective amplitude 412 of a frequency component of the time curve 400 of the ink flow quantity 402 for the respective change frequency 402. In other words, which ink flow rates or which change frequencies 411 of the ink flow quantity 402 are contained with which strength or with which energy in the time curve 400 of the ink flow quantity 402 may be ascertained. The amplitude spectrum 410 may be ascertained using a Fourier transformation, for example.

Whether an ink ejection error will be produced during the printing of the print image 300, due to changes of the ink flow quantity 402, may then be precisely determined or predicted on the basis of the amplitude spectrum 410. For this purpose, the controller 101 may be configured to compare the amplitude 412 of a frequency component for a defined change frequency 414 with an amplitude threshold 415 for the defined change frequency 414. This comparison may be performed for each of the plurality of change frequencies 414. Whether an ink ejection error will be produced may then be particularly precisely ascertained or predicted depending on the comparison. Via which frequency component of the time curve 400 of the ink flow quantity 402, and thus due to which change frequency 411, an ink ejection error will be produced may then possibly also be determined or predicted.

The amplitude thresholds 415 may be different for different change frequencies 411. A frequency-dependent sensitivity of the print bar 102 to changes of the ink flow quantity 402 may thus be precisely taken into account. The amplitude thresholds 415 for the different change frequencies 411 may have been experimentally ascertained in advance, for example using test print images 300 as depicted by way of example in FIG. 3a through 3c.

The controller 101 may also be configured to adapt the print data for the print image 300 to be printed depending on whether it is determined that an ink ejection error will be produced or not. In particular, the controller 101 may be configured to re-raster the original image, corresponding to the print image 300, depending on whether it is determined that an ink ejection error will be produced or not. The print quality of the printing device 100 may thus be efficiently and reliably increased. In particular, ink ejection errors may thus be reliably avoided, especially nozzle failures.

If it is determined or predicted for the print data that an ink ejection error will be produced, the controller 101 may be configured to adapt the print data such that, for the adapted print data, it is determined that no ink ejection error will be produced. This may be effected, in particular, via the reduction of the color space of the print image 300 or via a rotation of the image relative to the print bar. The strength of color changes in the print image 300, and thus the amplitude 412 of frequency components of the amplitude spectrum 410, may be reduced by reducing the color space. Alternatively or additionally, print data for different rasterings of the original image may possibly be ascertained, and via which of the print data no ink ejection error will be produced may be checked or predicted using the described method 500.

Alternatively or additionally, if it is determined for the print data that no ink ejection error will be produced, the controller 101 may be configured to adapt the print data via an expansion of the color space of the print image 300 such that no ink ejection error is produced even for the adapted print data. For example, the color space may be expanded so far that the amplitudes 412 of the frequency components of the amplitude spectrum 410 that are thereby produced continue to remain below the respective amplitude threshold 415, but at least in part are closer to the amplitude threshold 415 than is true for the original print data.

The controller 101 thus enables an improved compromise between providing an optimally large color space and avoiding ink ejection errors.

The controller 101 may be configured to identify, on the basis of the amplitude spectrum 410, at least one first frequency component for a first change frequency 411 that exhibits an amplitude 412 that exceeds the predefined amplitude threshold 415 for the first change frequency 411. If applicable, all frequency components may be identified for which this is true.

The print data may be adapted such that the amplitude 412 of the first frequency component of the amplitude spectrum 410 ascertained on the basis of the adapted print data is less than or equal to the predefined amplitude threshold 415. The print data may in particular be adapted such that this condition is satisfied for all frequency components. Ink ejection errors may thus be reliably avoided.

The controller 101 may be configured to ascertain, based on the amplitude spectrum 410, that the amplitudes 412 of the plurality of frequency components are respectively below a respective predefined amplitude threshold 415. It may thus be ascertained that no ink ejection errors are produced.

The print data may nevertheless be adapted such that the amplitudes 412 of the plurality of frequency components of the amplitude spectrum 410 ascertained on the basis of the adapted print data are respectively below the respective predefined amplitude threshold 415, and thus continue to produce no ink ejection errors. Furthermore, the print data may be adapted such that the amplitudes 412 of the plurality of frequency components of the amplitude spectrum 410 ascertained on the basis of the adapted print data are, at least in part, closer to the respective predefined amplitude threshold 415 than the amplitudes 412 of the plurality of frequency components of the amplitude spectrum 410 ascertained on the basis of the non-adapted print data. An expansion of the color space of the print image 300 to be printed may thus be reliably effected.

The stability and/or the print quality of a printing device 100 may be increased via the measures described in this document. Furthermore, the maintenance cost as a result of ink ejection errors, in particular as a result of nozzle failures, may be reduced. The productivity of a printing device 100 may also be increased.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 transport direction (of the recording medium)
21, 22 nozzle
31, 32 column (of the print image)
100 printing device
101 controller
102 print bar
103 print head
120 recording medium
140 print group
201 (negative pressure) vessel
202 ink
204 (reservoir) container
205 transport module (pump)
206, 208 ink supply channel
214 pressure module (pump)
300 print image
301, 302 region (print image)
310 characteristic sensitivity line
311/411 change frequency (ink flow quantity)
312 sensitivity
400 time curve of the ink flow quantity
401 point in time/line timing cycle
402 ink flow quantity/quantity value
410 amplitude spectrum of the ink flow quantity
412 amplitude (ink flow rate or frequency component)
414 critical change frequency
415 energy or flow rate threshold
420 threshold frequency function
500 method for ascertaining print data
501-503 method steps

The invention claimed is:
1. A device for ascertaining print data for a print image to be printed by a print bar of an inkjet printing device, the print bar including one or more nozzles and the print data indicates, for a plurality of dots of the print image, a respective ink quantity that is to be ejected by a respective nozzle of the one or more nozzles of the print bar, the device comprising:
   a communication interface configured to receive the print data; and
   processing circuitry that is configured to:
      ascertain, based on the print data, a time curve of an ink flow quantity of ink that, during the printing of the print image, flows in the print bar and/or is ejected from the one or more nozzles of the print bar;

determine, based on the time curve of the ink flow quantity, whether an ink ejection error will be produced by at least one nozzle of the one or more nozzles during the printing of the print image due to changes of the ink flow quantity; and adapt the print data for the print image to be printed based on the determination.

2. The device according to claim 1, wherein the processing circuitry is configured to:

ascertain, based on the time curve of the ink flow quantity, an amplitude spectrum indicative of, for a plurality of change frequencies of the ink flow quantity, a respective amplitude of a frequency component of the time curve of the ink flow quantity for the respective change frequency; and determine, based on the amplitude spectrum, whether an ink ejection error will be produced during the printing of the print image due to changes of the ink flow quantity.

3. The device according to claim 2, wherein the processing circuitry is configured to:

compare an amplitude of a frequency component for a defined change frequency with an amplitude threshold; and determine, depending on the comparison, whether an ink ejection error will be produced due to a change of the ink flow quantity with the determined change frequency.

4. The device according to claim 3, wherein:

amplitude thresholds are different for different change frequencies; and/or the amplitude thresholds for different change frequencies have been experimentally ascertained in advance.

5. The device according to claim 2, wherein the processing circuitry is configured to:

identify, based on the amplitude spectrum, at least one first frequency component for a first change frequency that exhibits an amplitude that exceeds a predefined amplitude threshold; and adapt the print data such that the amplitude of the first frequency component of an amplitude spectrum, said amplitude spectrum being ascertained based on the adapted print data, is less than or equal to the predefined amplitude threshold.

6. The device according to claim 2, wherein the processing circuitry is configured to:

ascertain, based on the amplitude spectrum, that the amplitudes of the plurality of frequency components are respectively below a respective predefined amplitude threshold; and adapt the print data such that the amplitudes of the plurality of frequency components of an amplitude spectrum ascertained based on the adapted print data are:

respectively below the respective predefined amplitude threshold; and at least in part, closer to the respective predefined amplitude threshold than the amplitudes of the plurality of frequency components of the amplitude spectrum ascertained based on the non-adapted print data.

7. The device according to claim 1, wherein:

the time curve of the ink flow quantity indicates a respective quantity value of ink for a sequence of line timing cycles;

the print head comprises a plurality of nozzles that are designed to print a corresponding plurality of dots of a corresponding plurality of columns of the print image at a defined line timing cycle;

the print data for each of the plurality of nozzles indicate an ink quantity that is to be ejected at the defined line timing cycle; and the processing circuitry is configured to determine a total of the ink quantity, indicated by the print data, of the plurality of nozzles for the defined line timing cycle, to ascertain a quantity value of the time curve of the ink flow quantity for the defined line timing cycle.

8. The device according to claim 1, wherein the processing circuitry is configured to re-raster an original image, corresponding to the print image, based on whether it is determined that an ink ejection error will be produced.

9. The device according to claim 8, wherein the re-rastering comprises rotating the original image 90 degrees.

10. The device according to claim 1, wherein the processing circuitry is configured to:

adapt the print data, via a reduction of a color space of the print image, in response to it being determined, for the print data, that an ink ejection error will be produced, such that the adapted print data does not produce an ink ejection error; and/or adapt the print data, in response to it being determined, for the print data, that no ink ejection error will be produced, via an expansion of the color space of the print image such that the adapted print data does not produce an ink ejection error.

11. A method for ascertaining print data for a print image to be printed by a print bar of an inkjet printing device, the print bar including one or more nozzles, and the print data indicates, for a plurality of dots of the print image, a respective ink quantity that is to be ejected by a respective nozzle of the one or more nozzles of the print bar, the method comprising:

ascertaining, based on the print data, a time curve of an ink flow quantity of ink that, during the printing of the print image, flows in the print bar and/or is ejected from the one or more nozzles of the print bar;

determining, based on the time curve of the ink flow quantity, whether an ink ejection error will be produced by at least one nozzle of the one or more nozzles during the printing of the print image due to changes of the ink flow quantity; and adapting the print data for the print image to be printed based on the determination.

12. A non-transitory computer-readable storage medium with an executable program stored thereon, that when executed, instructs a processor to perform the method of claim 11.

* * * * *